| MINOR LOOP INPUT COMMAND | LAST-STEP MEMORY | | | |
|---|---|---|---|---|
| | LM1 (26) | LM2 (27) | LM3 (28) | LM4 (29) |
| STOP (42) | TA1 | TB2 | TA2 | TB1 |
| CW (16) | TB2 | TA2 | TB1 | TA1 |
| CCW (17) | TB1 | TA1 | TB2 | TA2 |
| HIGH SPEED (18) | TA2 | TB1 | TA1 | TB2 |

United States Patent Office 3,476,996
Patented Nov. 4, 1969

3,476,996
HYBRID CLOSED LOOP STEPPING MOTOR CONTROL SYSTEM INCLUDING ACCELERATION AND DECELERATION CONTROL
Thorbjoern R. Fredriksen, Los Gatos, Calif., assignor to International Business Machines Corporation, Armonk, N.Y., a corporation of New York
Filed Dec. 30, 1966, Ser. No. 606,174
Int. Cl. H02p 1/04, 5/04
U.S. Cl. 318—138                                9 Claims

ABSTRACT OF THE DISCLOSURE

A stepping motor control system operable during acceleration to energize two windings of its associated stepping motor to initially cause it to move toward a new position 1½ steps in advance of the current position and then operable to cause energization of two windings corresponding to a new position 2½ steps in advance of the current position. During deceleration, said control system is operable to energize one winding of the stepping motor leading the current rotor position by 1 step and then operable to energize the winding corresponding to the rotor position.

---

This invention relates to positional servo mechanisms in general and more particularly to a stepping motor control system which is operable during acceleration to energize two windings of its associated stepping motor to cause it to initially move toward a new position one and one-half steps in advance of the current position then when the motor is rotating at a velocity above a predetermined level operable to cause energization of two windings corresponding to a new position two and one-half steps in advance of the current position.

Until recently pulses were cause to be sequentially applied to two of four appropriate windings to cause a rotor to move to the next adjacent step in the directed direction of movement. The speed of the motor was determined by the pulse rate of the pulse train. It was chosen such that with a "worst case" load, the rotor would have time to move into substantial alignment with the new step position. Several shortcomings are attendant the use of this type of system. One problem is that it is velocity limited not only by the necessity of choosing a pulse rate which will assure the arrival of the driven load at a new position without pulse slipping, but additionally by the fact that the top speed which may be achieved through energization of windings to cause the rotor to move a single step is quite low.

To alleviate these problems, there is provided in U.S. patent application Ser. No. 462,955 entitled "Closed Loop Stepping Motor Control System" filed June 10, 1965, assigned to the assignee of the subject application, a system wherein the pulses to cause the motor to rotate are self-generated. A reading of this application will facilitate an understanding of the subject invention. Briefly, in that system, a conventional stepping motor is employed. Connect to its rotor shaft is a step discriminator disk which is in optical association with four light sources and four photocells which provide signals indicative of the actual rotational position of the shaft. The output of the step discriminator is fed into a translator which also receives input or control commands. The translator translates the input commands of stop, clockwise, counterclockwise and high speed into potentials which are applied to appropriate windings of the step motor such that the desired command is implemented irrespective of the instantaneous position of the motor shaft. Additionally, in the high speed mode of operation, the translator causes the motor rotor to seek a step located up to 2 steps away from the present rotor or shaft location rather than, as in the normal case, causing the motor to be energized for a position located one step away from the present rotor position such that high speed operation is effected. This system limits out at approximately 2000 steps per second. From stop, as pointed out in the application, energization of windings two steps from the present rotor position will result in equal torque being applied in both directions and therefore the motor must initially be operated in the usual single step mode of operation. With this single step mode of operation, the motor limits out at 200 steps per second which is slightly above the critical speed. If the motor is above the critical speed, the high speed mode of operation can be entered into, if it is under, energization of windings two steps away could possibly result in motor reversal. To assure that the motor is above the critical speed, a speed sensing device must be employed. The speed sensing device cannot operate on absolute speed alone but must look back at past history since the motor tends to oscillate in the two phase mode with variations in speed upwards of 50%. Thus, the motor must be up on an "up" oscillation and be above the critical speed before the high speed mode of operation can be entered into. This oscillation in the two phase mode of operation is also present at high speeds.

In many applications, this oscillation presents no problem. However, in certain applications, as in driving against a stop, oscillation cannot be tolerated. Another problem encountered in the two phase mode of operation is that of motor heating. Since in the two phase mode of operation, the rotor positions are magnetically centered between two poles, the windings of these two poles, to assure positional accuracy, must be energized while at stop. This results in motor heating.

It is therefore an object of the present invention to provide a novel stepping motor system which is operable in both a high speed mode and a low speed mode in either the clockwise or counterclockwise direction.

Another object of the present invention is to provide a new stepping motor system wherein a hybrid mode of operation is utilized in which during acceleration and at high speed, a two phase mode of operation is employed while during deceleration and while at stop, a single phase mode of operation is employed.

Another object of the present invention is to provide a new stepping motor system in which, due to utilization of the single phase mode of operation for stop, the motor is magnetically held in a minimum air gap configuration at its stop position upon removal of energizing current.

Another object of the present invention is to provide a stepping motor control system wherein, for movements of multiple steps, time optimal performance is achieved during both the acceleration and deceleration modes of operation.

Another object of the present invention is to provide a novel stepping motor control system wherein, for movements of single steps, time optimal performance is achieved.

The foregoing and other objects, features and advantages of the invention will be apparent from the following more particular description of a preferred embodiment of the invention, as illustrated in the accompanying drawings in which.

Figure 1:
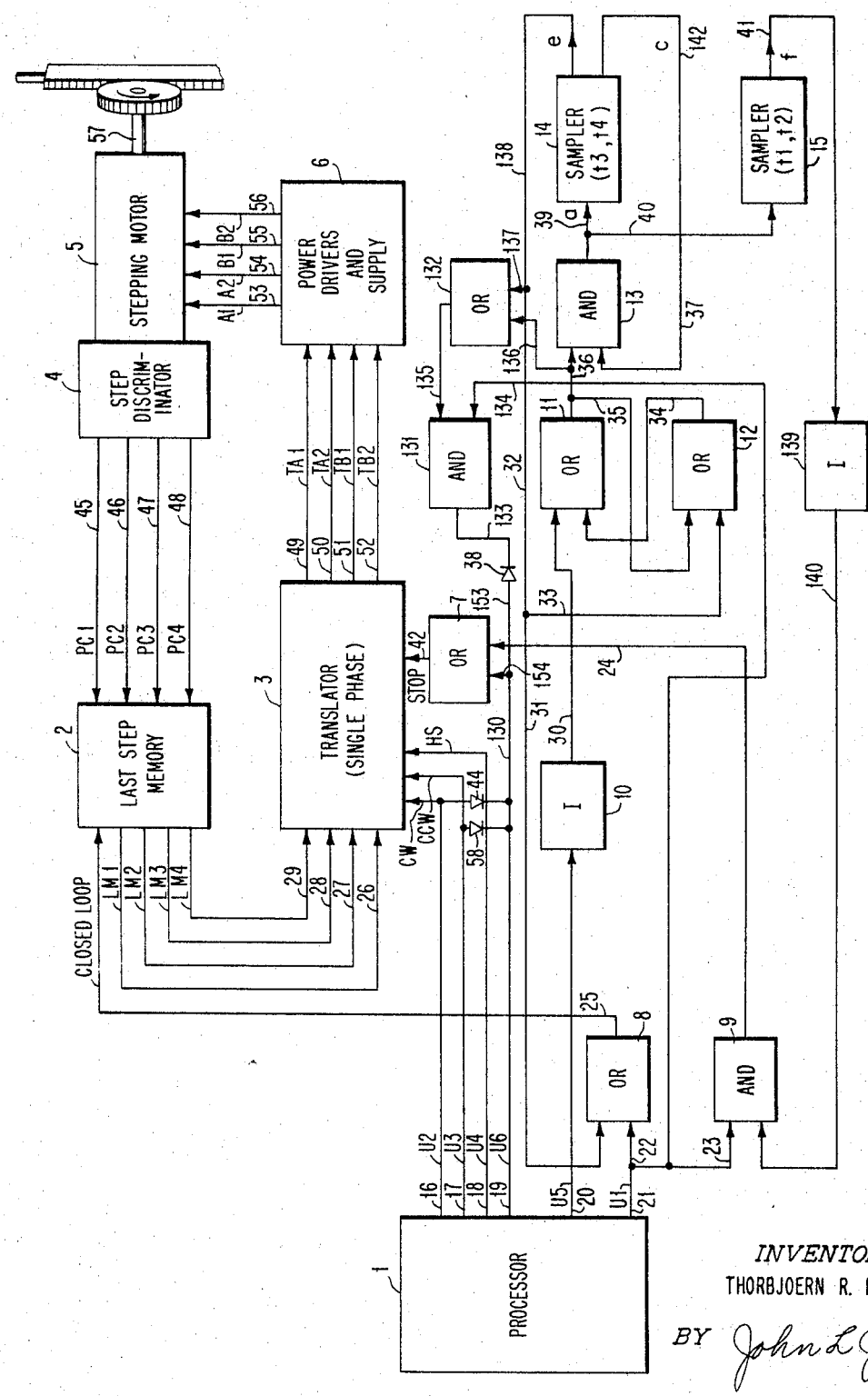
FIG. 1 is an overall schematic of the hybrid stepping motor control system.

Briefly, in the subject hybrid system, two modes of operation are employed. A single phase mode of operation is employed to precisely position the rotor at stop and is also used during deceleration. A hybrid mode of operation combining single phase sensing and two phase energization is utilized for acceleration and the synchronous speed mode of operation.

The system, therefore, includes means for providing an output pulse indicative of current rotor position when the rotor is in alignment with a pole of the motor and means for applying the output pulses simultaneously to two adjacent windings during acceleration and to one of said windings during deceleration. In the preferred embodiment, the means for providing output pulses comprises a discriminator disc and last step memory while the means for applying comprises a translator, a processor and a power driver.

The discriminator disk which is identical to that described in the aforementioned application. Ser. No. 462,955 is aligned on the rotor shaft such that pulses are produced when the rotor is aligned with the poles as in the single phase mode of operation rather than between the poles as in the conventional two phase mode of operation. Energization of the nearest two phase windings in the direction to be moved results in a "one and one-half step" torque. This added one-half step allows the motor to accelerate smoothly up to approximately 1200 steps per second. Due to this smooth and predictable acceleration and since the motor is traveling well above its critical speed, the shift into high speed can be accomplished by reliance on time alone. After the predetermined time, the shift into the high speed mode of operation is effected and the translator continues to sense on the single phase steps and energize windings in accordance with the two phase mode of operation 2½ steps from the sensed position. The motor then accelerates up to approximately 3000 steps per second where it limits out. The motor limits out when the time for the rotor to travel the 2½ steps equals the time for the coil impedance, hysteresis, back E.M.F., etc. to be overcome. Thus, at the limiting speed, the torque from the winding is applied to the rotor just as the rotor arrives at that position. As indicated above, this lead in the hybrid system is equal to 2½ steps.

During the first phase of deceleration, the translator acts again to sense on the single phase steps but applied energization to the single phase windings lagging the current rotor position by 1½ steps which causes the motor to decelerate smoothly from 3,000 to 600 steps per second. Deceleration from 600 steps per second is accomplished by the traditional single phase stop mode of operation of energizing the winding corresponding to the rotor position. Once the rotor is positioned at its target position, power to all the coils can be dropped and the motor will magnetically hold with a force nearly equal to the force obtained by energizing the windings in either the two phase or single phase modes.

In the following description and claims, the motor will be described, for purposes of simplicity, as having four windings on four poles and the rotor as having one pole which can be aligned between two adjacent poles by energization of their respective windings or aligned with a single pole by energization of its associated winding. It will, of course, be understood that as a practical matter this is not usually the case in that the most commonly used stepping motors have rotors with fifty poles. A good detailed description of a stepping motor will be found in Applications and Industry, March 1962, "Characteristics of a Synchronous Inductor Motor" by A. E. Snowdon and E. W. Madsen.

For a more detailed description of the subject system, refer first to FIG. 1, wherein is shown a stepping motor 5 with an attached step discriminator 4 which provides step identification signals (PC1–PC4) along lines 45–48 to a last step memory 2. The step discriminator 4 preferably comprises the photocell-disc-light source combination of the previously mentioned application Ser. No. 462,955. The signals on lines 45–48 would then be outputs from the photocells. The last step memory 2 also receives a closed loop signal along line 25 through OR circuit 8, as will later be described. The last step memory provides signals (LM1–LM4) indicative of the last step made (current rotor position) along lines 26–29 to a single phase translator 3. The translator also receives signals from the processor 1 along lines 16–18 which indicate the direction to be moved and whether or not the high speed mode of operation is to be entered into. Additionally, the translator receives a stop input signal along lines 19 and 130 through OR circuit 7 and along line 42 in the event that the stop mode of operation is to be entered into. The translator is operable, based on the last step information (LM1–LM4) received along lines 26–29, to cause appropriate signals (TA1, TA2, TB1, TB2) to be applied on lines 49–52 to the power drivers and supply 6 to cause energization to the step motor windings A1, A2, B1 and B2 (lines 53–56), respectively, such that the motor moves in accordance with the commands received from the processor 1.

Figure 8:
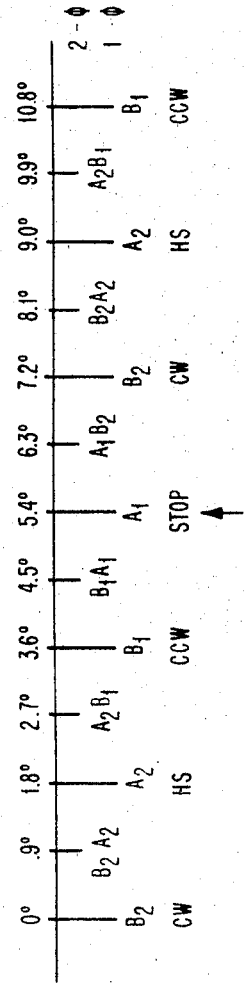
FIG. 8 is a chart illustrative of the single phase and dual phase positions of a stepping motor.

To facilitate a more detailed description of the theory of operation of the subject hybrid system, refer next to FIG. 8. In FIG. 8, a portion of the rotation movement of a motor shaft is, for purposes of simplicity, shown in a linear manner. As shown in FIG. 8, with conventional two phase operation if windings B1 and A1 are energized, the rotor will move to a position corresponding to 4.5°. While at 4.5°, energization of windings A1 and B2 will cause the rotor to move in the clockwise direction and energization of windings A2 and B1 will cause the rotor to move in the counterclockwise direction. Thus, in the two phase mode of operation, two adjacent windings are energized which causes the rotor to position between them. On the other hand in the single phase mode only a single winding is energized and the rotor will align directly with the energized winding in a minimum air gap configuration. In the single phase mode if the rotor is sitting at 5.4° and winding A1 is energized, the rotor will not move but will hold (STOP); winding B2 corresponds to a clockwise command; winding B1 corresponds to a counterclockwise command; and winding A2 corresponds to a high speed command.

In the hybrid system, both the single and two phase modes of operation are employed. Further, in the hybrid system as above noted, the discriminator disk senses on the single phase oppositions. That is, when the rotor is aligned with positions 0, 1.8°, 3.6°, 5.4°, etc., an alignment pulse will be produced. When the rotor is not so aligned, no pulses (dark spaces) will exist.

In operation during initial acceleration, windings leading the sensed position by one and one-half steps are energized. That is, the two phase mode of operation is employed which would normally result in a single step lead but since sensing is done on single phase steps, this results in a 1½ step lead. For example, assume that the rotor is at 5.4°. If windings B2 and A2 are energized, the rotor will be lead by one and one-half steps in the clockwise direction. This results in more net torque than conventional single phase energization (B2) which will lead by only one step. This mode of operation is followed until the motor speed is approximately 1000 steps per second and then the high speed mode of operation is entered into. In the high speed mode, windings leading the sensed position by two and one-half steps are energized. For example, assume that the sensed position is 5.4°. In this case, windings A2 and B1 would be energized. The net effect, however, is that the lead is greater than 2½ steps since the arrival of the rotor at the sensed position is detected about ¼ step before complete alignment is accomplished. The actual lead is therefore close to 2¾ steps. The motor will then accelerate in this high speed mode smoothly up to approximately 3000 steps per second.

During deceleration, if the motor is above 600 steps per second a single winding leading the current sensed position by one step is energized. Thus, if the sensed position is again 5.4° and the rotor is traveling in the clockwise direction, winding B2 (CW) is energized. If the motor is limiting out in the high speed mode, this will result in a deceleratoin torque of one and one-half steps since by the time the pulse is effective the rotor will be at 9.9°. This mode of deceleration is continued until the motor speed falls below 600 steps per second. Deceleration from 600 steps to 0 is accomplished by the usual single phase mode of operation, i.e., applying stop (energizing the winding corresponding to the sensed position). Since, as above indicated, the single phase steady state step positions are located physically .9° or ½ step from the respective two phase locations and coincide with the minimum air gap configurations of the motor, the motor will not shift location in the single phase mode when deenergized from a steady state step position. In the two phase mode on the other hand, the motor will slip ½ step when deenergized from a steady state position.

Figure 2:
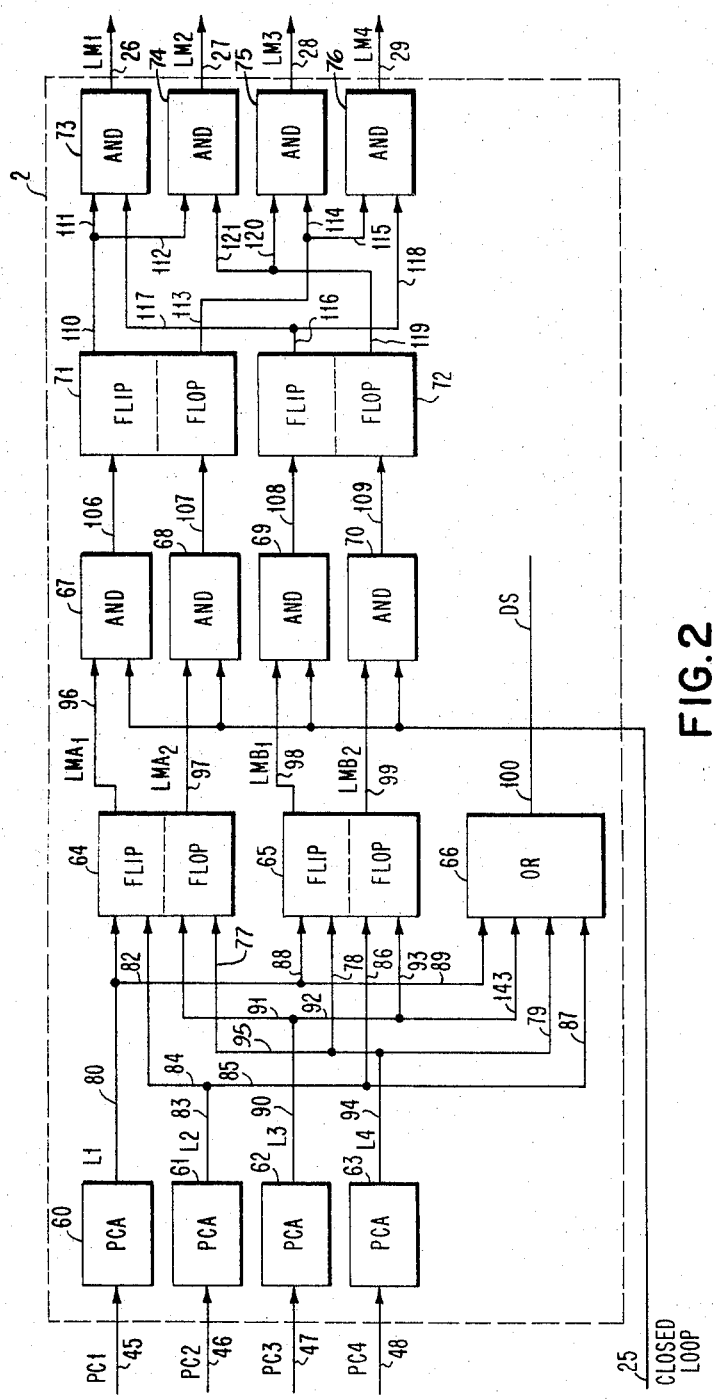
FIG. 2 is a schematic of the last step memory of FIG. 1.
Figures 3, 4:
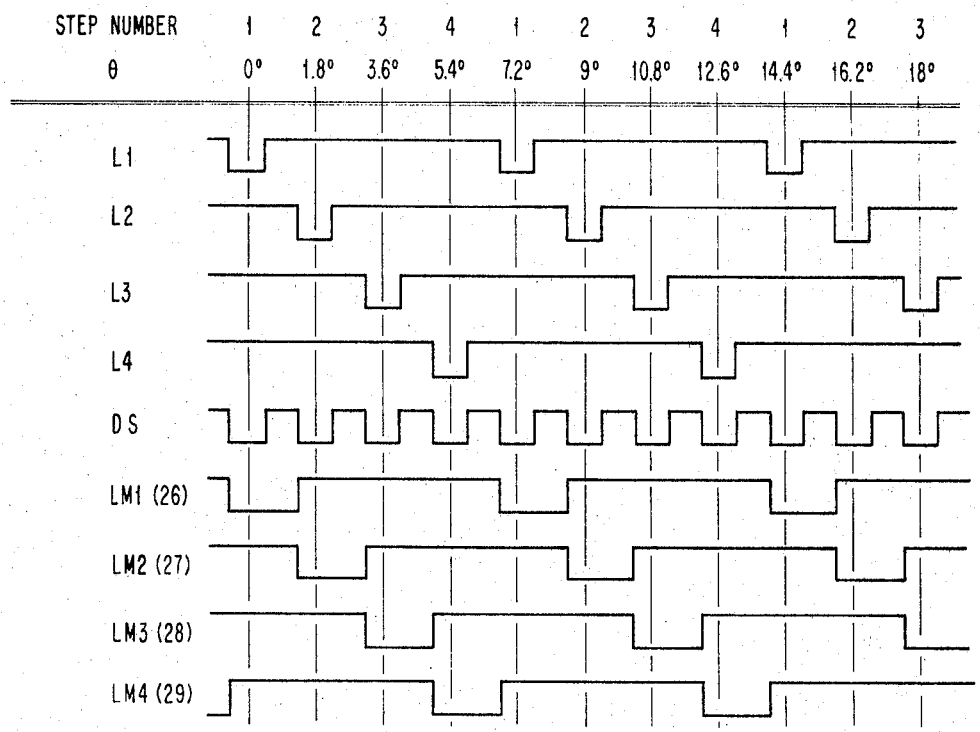
FIG. 3 is a chart illustrative of the operation of the last step memory of FIG. 2.
FIG. 4 is a chart illustrative of the operation of the translator of FIG. 9.

Refer next to FIG. 2 which is a schematic of the last step memory 2 of FIG. 1. The last step memory receives signals from the photocell sensors of the step discriminator 4 on lines 45–48. Photocell amplifiers 60–63 amplify these signals to the logic levels used in the system. The output of one of the amplifiers is low when the output shaft 57 (FIG. 1) is in alignment with one of the four positions. When the output shaft is between positions as illustrated in FIG. 3, wherein the positions in steps and degrees are plotted against signal output, dark space is indicated. Since there is dark space between adjacent steps, the previous step information must be converted into continuous last step signals for use by the system for reasons which will hereinafter become apparent.

The particular last step information is stored in flip flops 64 and 65. A low output from amplifier 60 will, acting along line 80, set FF 64 such that its set output line 96 is positive and acting along lines 80, 82 and 88 sets FF 65 such that its set output line 98 is positive. A low logic level from amplifier 61 will, acting along lines 83 and 84, set FF 64 such that its output line 96 is at a positive logic level and acting along lines 83, 85 and 86, reset FF 65 such that its reset output line 99 is at a positive logic level. A negative logic level from amplifier 62, acting along lines 90 and 91, will reset FF 64 such that its reset output line 97 is at a positive logic level and acts on lines 90, 92 and 93 to reset FF 65 such that its reset output line 99 is at a positive logic level. A negative logic level from amplifier 63 acts along lines 94, 95 and 77 to reset FF 64 such that its reset output line 97 is at a positive logic level and acts along lines 94, 95 and 78 to reset FF 65 such that its set output line 98 is at a positive logic level. Thus, each step is uniquely stored in the two binary bits provided by FF's 64 and 65 and maintained on the output lines of these FF's until a new step has been made.

Each of the outputs from the photocell amplifiers 60–63 are applied and make up one input to OR circuit 66 which is the dark space OR circuit, such that when none of the input lines to the OR circuit are negative, it will cause a positive output to be applied along line 100.

The set outputs from FF's 64 and 65 are applied along lines 96 and 98 to AND gates 67 and 69, respectively, while the reset outputs from FF's 64 and 65 are applied along lines 97 and 99, respectively, to AND gates 68 and 70. The other input term of each of AND gates 67–70 is along line 25 from the processor 1. When the closed loop mode of operation is to be entered into, line 25 will be brought up to a positive logic level. As is obvious, if the signal on line 25 is down, the information indicative of the last step stored in FF's 64 and 65 will not pass on along output lines 106 and 109 from AND gates 67 through 70. However, if line 25 is up, FF's 71 and 72 will be set in accordance with the information stored in FF's 64 and 65. Thus, during closed loop operation which is initiated by an up level on line 25, the logic levels on lines 110, 113, 116 and 119 correspond to the information appearing on lines 96–99, respectively. As will later become more apparent, it is sometimes desirable to discontinue the closed loop mode of operation by changing line 25 to a low logic level. In this event, FF's 71 and 72 will continue to store information corresponding to the last step before the loop was opened while FF's 64 and 65 will continue to update their output information to that of the last step seen by the step discriminator.

The set output appearing on line 110 of FF 71 is passed along lines 111 and 112 and makes up one input term to AND gates 73 and 74, respectively. The reset output from FF 71 appearing on line 113 is fed along lines 114 and 115 and makes up one input term to AND gates 75 and 76, respectively. The set output from FF 72 appearing on line 116 is fed along lines 117 and 118 and makes up a second input term to AND gates 73 and 76, respectively, while the reset output from FF 72 appearing on line 119 is fed along lines 121 and 120 to make up the second input term to AND gates 74 and 75, respectively. Thus, with this particular configuration, when FF's 71 and 72 are set, line 26 will be at a positive logic level indicating a type 1 step. When FF 71 is set and FF 72 is reset, the logic level on line 27 from AND gate 74 is at a positive logic level indicating a type 2 step. When FF 71 is reset and FF 72 is reset, the output from AND gate 75 will be positive on line 28 thus indicating a type 3 step while when FF 71 is reset and FF 72 is set, the output from AND gate 76 appearing on line 29 will be positive thus indicating a type 4 step.

Figure 9:
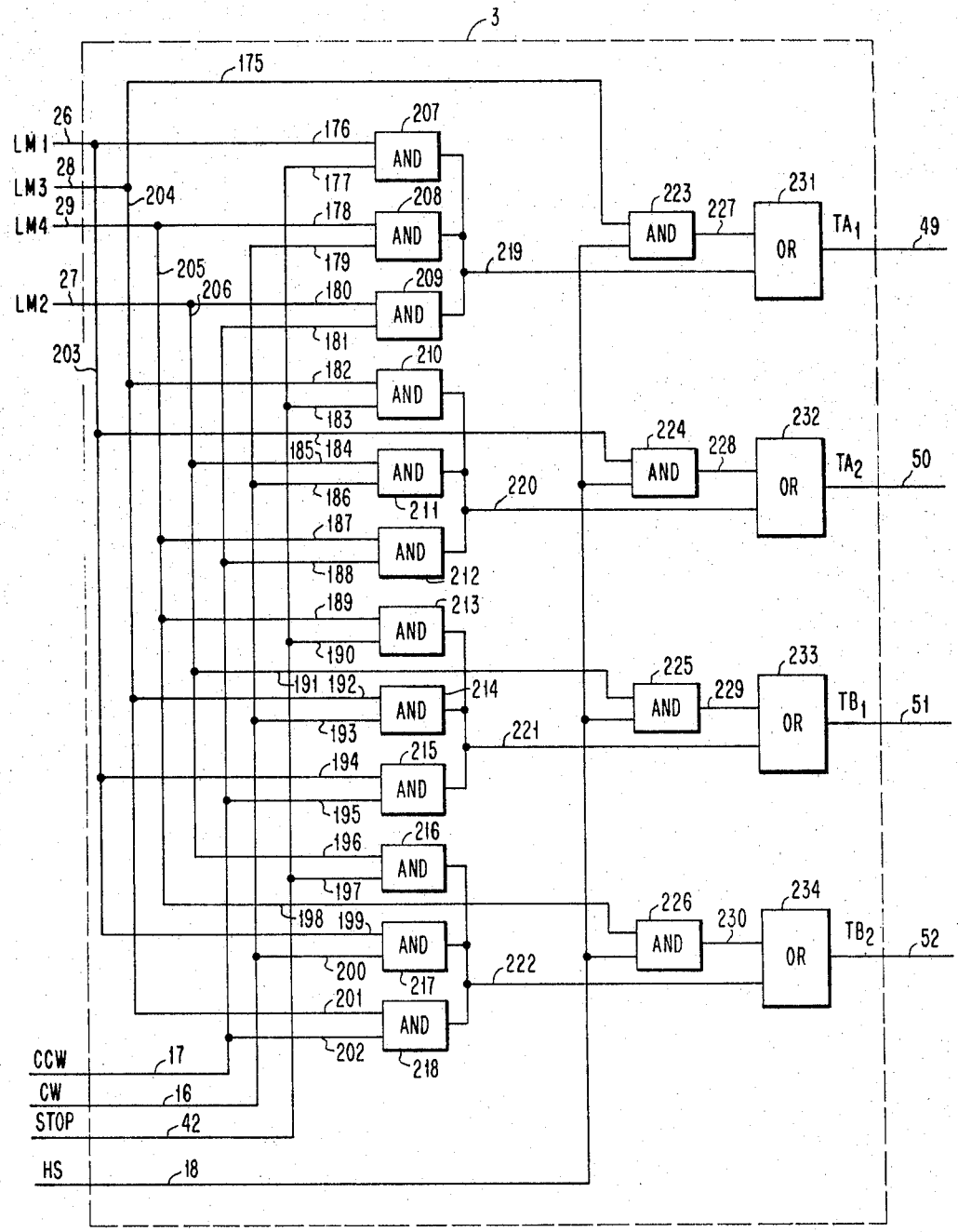
FIG. 9 is a schematic of the single phase translator of FIG. 1.

In FIG. 4 is shown a chart of the translator outputs required for specific input commands. This chart will be more readily understood from a consideration of FIG. 8. Thus, as shown in FIG. 8, if the last step is at 5.4° to accomplish a clockwise movement, winding B2 must be energized while to accomplish a counterclockwise movement, winding B1 must be energized. Likewise, in the two phase mode of operation, windings B2 and A2 must be energized to move in the high speed mode in the clockwise direction while windings A2 and B1 must be energized to move in the high speed mode in the counterclockwise direction. In FIG. 9 is shown a translator for providing the appropriate inputs to the power supply and drivers 6 in response to last step memory information appearing on lines 26–29 and commands appearing on lines 16–18 and 42. In FIG. 9 is shown a number of AND gates 207–218 which receive positional information from the last step memory along lines 26–29 and command information along lines 16–18 and 42.

Line 26 is connected along line 176 to AND gate 207; along line 184 to AND gate 224; along line 194 to AND gate 215; and along line 199 to AND gate 217. Line 28 is connected along line 175 to AND gate 223; along lines 204 and 182 to AND gate 210; along lines 204 and 192 to AND gate 214; and along lines 204 and 201 to AND gate 218. Line 29 is connected along line 178 to AND gate 208; along lines 205 and 187 to AND gate 212; along lines 205 and 189 to AND gate 213; and along lines 205 and 198 to AND gate 226. Line 27 is connected along line 180 to AND gate 209; along lines 206 and 185 to AND gate 211; along lines 206 and 191 to AND gate 225; and along lines 206 and 196 to AND gate 216. Counterclockwise line 17 is connected along lines 202, 195, 188 and 181 to AND gates 218, 215, 212 and 209, respectively. Clockwise command line 16 is connected along lines 200, 193, 186 and 179 to AND gates 217, 214, 211 and 208, respectively. Stop command line 42 is connected along lines 197, 190, 183 and 177 to AND gates 216, 213, 210 and 207, respectively. High speed command line 18 is connected to each of the AND gates 223–226.

The outputs of AND gates 207–209 are tied together and applied along line 219 to OR circuit 231 which receives another input along line 227. The output of OR circuit 231 is applied to line 49. The output of AND gates 210–212 are tied together and applied along line 220 to OR circuit 232 which also receives an input along line 228 from AND gate 224. The output of OR circuit 232 is applied to line 50. The outputs of AND gates 213–215 are tied together and applied along line 221 to OR circuit 233 which also receives an input along line 229 from AND gate 225. The output of OR circuit 233 is applied to line 51. The outputs of AND gates 216–218 are tied together and applied along line 222 to OR circuit 234 which also receives an input along line 230 from AND gate 226. The output of OR circuit 234 is applied to line 52.

For purposes of illustration of the operation of the translator, assume that the last step memory indicates that the motor is at a type 1 step and that a clockwise movement is to be effected in the high speed mode. In this case, energization of clockwise line 16 and high speed line 18 would result in AND gate 224 having its conditions met since the high speed line is up and an up level applied along lines 26, 203 and 184 to AND gates 224. Thus, winding A2 will be energized. Likewise, winding B2 would be energized since AND gate 217 has a positive potential applied along lines 16 and 200 and along lines 26, 203 and 199 such that the combined input of AND gates 216–218 as applied to line 222 is negative. This negative potential is then applied through OR circuit 234 to energize winding B2. The same is true of the other combinations.

As is obvious from a consideration of FIG. 8, the previously described operation results in energization of the first and second windings leading the sensed position by 1½ steps. To accomplish the top speed mode of operation from a consideration of FIG. 8, it will be seen that if the last step is at 5.4° and clockwise movement is being effected, that the second and third windings A2 and B1 must be energized. Thus, after the motor exceeds a predetermined speed as previously discussed, the input command must be changed by the processor from clockwise to counterclockwise to cause the high speed mode of operation in the clockwise mode of operation.

To accomplish deceleration if the motor is moving in the clockwise direction and above 600 steps, energization of the clockwise command (first winding in the direction of travel) will cause the motor to decelerate down to 600 steps and application of Stop (winding corresponding to current rotor position) will halt the motor. The net effect is that if the motor is limiting out, this will amount to a retarding torque of 1½ steps which, from a consideration of FIG. 8 will be seen to be the maximum retarding torque possible. For example, if the sensed position is 5.4° and the actual rotor position is 9.9°, energization of the winding corresponding to 7.2° will result in a ½ step retarding torque while energization of windings A1 and B2 for a 2 step retarding torque would have no effect on the motor since equal positive and negative torque would result.

Figure 7:
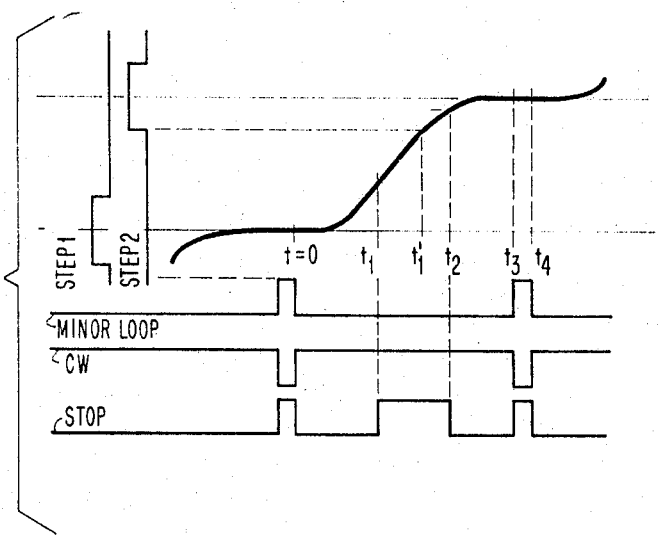
FIG. 7 is a chart illustrative of the step-to-step movement of the system.

Refer next to the lower part of FIG. 1 which is the step-to-step controller. During step-to-step operation (single step), the step-to-step controller provides a hybrid mode of operation which is quite similar to the previously described hybrid movement for a number of steps. As illustrated by the curve of FIG. 7, the object is to perform a single step in a time optimal manner. As previously described, the time optimal manner may be closely approximated by selective energization of a single winding or by application of a direction and stop command; i.e., energization of two windings. As shown in FIG. 7 with the system setting initially at zero velocity, the minor loop is closed and the direction command, in this case for purposes of illustration a clockwise command, is inhibited. At the same time, a stop command is applied to the translator. At time $t0$, the minor loop is opened, the clockwise command is allowed to pass to the translator and the stop command is turned off. When this occurs, the motor then begins to accelerate in a time optimal manner until time $t1$ at which time the stop command is again applied to the translator. During times $t0$ and $t1$, the motor was operating in a single phase mode of operation in that only a single winding was energized. As previously described, however, for hybrid operation, the stop command must be applied in addition to the clockwise command. This occurs at $t1$. At time $t2$, the stop command is dropped and the system then continues to decelerate because of the time lag of the motor. Prior to this time at time $t1'$, the output shaft of the motor had rotated such that it was in substantial alignment with the new position such that an output pulse, if the motor was operating in the traditional manner would then be applied so that the motor would continue on to the next step. However, since the minor loop is open, the arrival of the rotor at the position corresponding to time $t1$ is not transmitted to the translator. The last step memory still retains an indication as to the previous step. At time $t3$, the rotor has come to a standstill at the magnetic center of the new step and the coil is energized corresponding to the steady state rotor position; i.e., no further motion will take place. The clockwise input to the translator converts the previous step indication into a motor input corresponding to one step ahead thus the rotor having advanced one step is at the steady state. At $t3$ also, the command input to the translator is changed from clockwise to a stop command and simultaneously the loop is closed. The combined effect is that no input change to the motor takes place.

The updating of the last step memory advances the step input to the translator by one which cancels the change from a one step to a zero step lead by the stop command.

The system for accomplishing the above briefly described step-to-step operation is as previously stated shown in the lower part of FIG. 1. In FIG. 1, there are three lines which effect the operation of the system to cause it to operate in a step-to-step mode as distinguished from the normal mode of operation. These lines are 24, 25 and 133. When lines 24 or 133 are positive, the processor has sole control over the four input commands to the translator along lines 16–19. In addition, if line 25 is positive, the motor is operable in the normal closed loop fashion. If line 25 is negative the step-to-step operation is implemented as follows, when line 25 goes negative, the minor loop is opened. When line 24 goes negative, the stop command is added to whatever direction command the processor has applied to the translator. More specifically, line 24 causes the OR circuit 7 to provide a positive input to the translator regardless of the other input to it through line 130. When line 133 goes negative, stop is implemented through OR circuit 7. The direction command inputs are also clamped to the minus level through diodes 44 and 58. Likewise, closed loop plus stop is applied during time $t3$ and $t4$ along line 133, while line 25 merely serves to open and close the loop at appropriate times; i.e., the loop is open from time $t0$ to $t3$.

The processor is in complete control in the step-to-step movement, the processor must apply at time *t*0 logic levels to certain lines as follows.

Either lines 16 (U2) or 17 (U3) are set to a positive logic level to apply direction to the system; line 18 (U4) has a negative logic level applied to it to prevent the conventional hybrid mode of operation; line 19 (U6) has a positive logic level applied to it to select the single step mode of operation; and halt is removed by bringing line 20 (U5) to a positive logic level.

Prior to time *t*0, the system is, in the usual case, in the closed loop mode of operation. At this time, lines 20 and 21 have a negative logic level applied to them by the processor. The negative logic level applied to line 20 is inverted in an inverter 10 and appears as a positive logic level on line 30 which constitutes one input to OR circuit 11. The other input to OR circuit 11 is likewise positive at this time since as will later be described, the output of OR circuit 12 which appears on line 34 is positive due to the presence of a negative logic level on lines 138, 32 and 33 during the time *t*3 to *t*4. This sets the latch arrangement of OR circuits 11 and 12 so that the output on line 34 of OR circuit 12 is positive. As is apparent, the output of OR circuit 11 is fed back along line 35 and constitutes an input to OR circuit 12 while the output from OR circuit 12 is fed along line 34 and constitutes one input to OR circuit 11. Thus, the two constitute a conventional latch.

In the following description, the OR circuits operate as follows. Any negative input will yield a positive output. The AND circuits operate as follows. Any negative input will yield a positive output while both positive inputs will yield a negative output.

The presence of positive inputs to OR circuit 11 results in a negative output on line 36 which is applied to AND gate 13. The presence of the negative input to AND gate 13 results in a positive logic level on input line 39 to the time *t*3–*t*4 sampler 14 as well as the input line 40 of *t*1–*t*2 sampler 15. A positive input level to the samplers 14 and 15 resets them while a negative input level starts them timing out.

Figure 5:
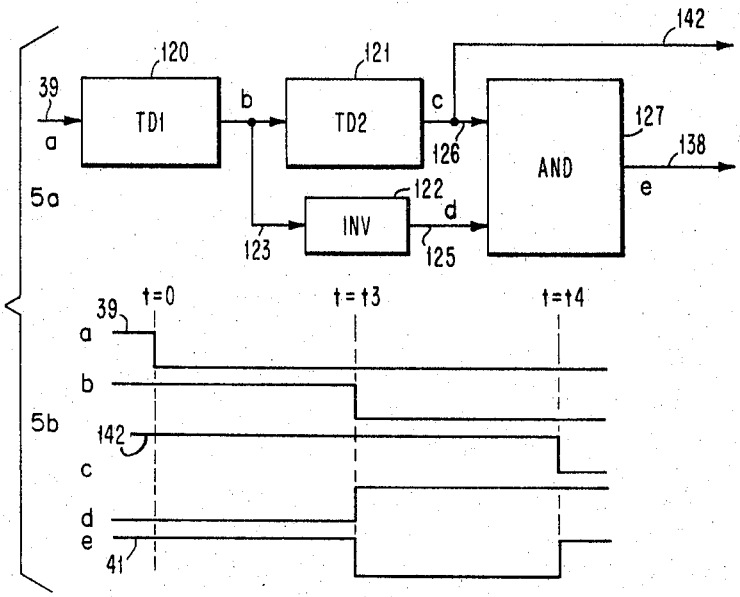
FIG. 5A is a schematic of the sampler employed in the step-to-step system of FIG. 1.
FIG. 5B is a chart illustrative of the operation of the sampler of FIG. 5A.

For a more detailed description of the operation of sampler *t*3–*t*4, refer to FIG. 5 which shows the sampler timing as well as the sampler schematic. As shown in FIG. 5, a positive logic level is present on line 39 until time *t*0. At time *t*0, line 39 falls to a negative logic level and this negative logic level is applied to the time delay 120. A predetermined period of time after *t*0, TD 120 times out and changes its output from plus to minus. This starts TD 121 timing out. During the timing out of TD 121, its output on line 126 is positive and the output of TD 120 is negative which when inverted appears as a positive logic level on line 125 through line 123 and inverter 122. Thus, both inputs to AND gate 127 are positive while TD 121 is timing out. This results in a negative level on line 138. As soon as TD 121 times out, its output changes from a positive to a negative level and the input to AND gate 127 on line 125 is upset and the output on line 138 goes positive. The net effect is that negative level appears on line 138 from *t*3 until *t*4.

Line 142 is an auxiliary output from the sampler which is at a positive level during reset and during the combined timing out of the two time delays and switches to negative level only after the sampler function is completed.

The other sampler 15 shown in FIG. 1 operates in a similar manner to that just described.

Prior to time *t*0, the input on lines 39 and 40 is positive and resets all time delays and sets the output line 142 to positive level and lines 138 and 41 to positive levels. Line 138 is connected to OR circuit 132 along line 137. As previously described, a positive level will have no effect on the OR function. Initially, line 37 is positive. Thus, the input on line 36 determines the fulfillment of the AND conditions. Prior to time *t*0, line 36 is negative due to the previous setting of the OR circuits 11 and 12. Therefore, the output of AND gate 13 is positive.

The output on line 41 from sampler 15 is applied to AND gate 9 through an inverter 139 along line 140. Inverter 139 thus causes a negative level to be applied to line 140 prior to time *t*0 and thus the output on line 24 from AND gate 9 is positive. This is required when the system is operating in other than the step-to-step mode. Also prior to time *t*0, OR circuit 8 provides a positive output on line 25 since input line 21 is held negative by the processor. Line 21 is also connected to AND gate 131 along line 134 and therefore line 133 from AND gate 131 is positive. Thus, prior to time *t*0, all the conditions previously described for lines 24, 133 and 25 have been fufilled.

Figure 6:
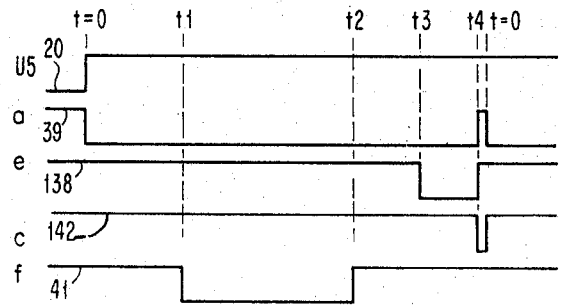
FIG. 6 is a chart illustrative of the operation of the single step operation.

Referring to FIG. 6, at time *t*0, the processor changes lines 20 and 21 to positive levels. The positive level on line 20 is inverted by inverter 10 to a negative level on line 30 which results in a positive level on line 36 and latches up and maintains the positive level on line 36. Since line 37 is positive, the conditions of AND gate 13 are met and the output on lines 39 and 40 switches to a negative level allowing the samplers to begin their timing cycle. From time *t*0 to *t*1, the output from the samplers remains as previously described for the time prior to time *t*0. However, since the processor simultaneously has removed the stop condition on line 19 and no further stop levels are applied along lines 24 and 133, the translator is allowed to initiate motor action. At time *t*0, line 21 is changed from a negative level to a positive level to allow the open loop mode of operation. The translator will continue to have the last step information seen by the step discriminator applied to it by the last step memory.

At time *t*1, sampler 15 produces a negative level on line 41 which through inverter 139 applies a positive level on the input of AND gate 9. Its conditions are thus fulfilled because the other input on line 23 is likewise positive. A negative level thus appears on line 24. This input is applied through OR circuit 7 to apply stop along line 42 to the translator. This input is maintained from time *t*1 to *t*2 and the net effect is to decelerate the motor. From time *t*2 to *t*3, the inputs to the translator are the same as prior to *t*1; namely, direction command only. Due to the time lag in the motor, however, the rotor will still decelerate until time *t*3. At time *t*3, it has reached step 2. Sampler 14 then produces a negative input to OR gate 132. The output of which applies a positive input to AND gate 131 on line 135. The other input on AND gate 131 is positive since it is connected directly to line 21. The output of AND gate 131 then switches to a negative level thus clamping the direction commands appearing on lines 16 and 17 by means of diodes 44, 58 and 38 along lines 133, 153 and 130. Simultaneously, a stop command is applied to the translator along line 42 through OR circuit 7. Also, line 138 constitutes one input to OR circuit 8 along lines 31 and 32. Thus, the change to a negative level at time *t*3 results in the application of a positive level along line 25 from OR circuit 8 which closes the minor loop.

From time *t*3 to *t*4, these conditions are maintained on the translator which allows updating of the last step memory but does not allow input changes to the motor.

At time *t*4, line 142 goes negative as shown in FIG. 6. This provides a negative level on line 37 and the output of AND gate 13 then goes positive which resets samplers 14 and 15 a short time later. This short period of time is determined by the response lag of the samplers. Then, line 142 changes back to a positive level which removes the negative input to AND gate 13 and a negative level is applied to the samplers which then begin a new timing cycle and a new step motion by the motor.

If during the step operation, a decision is made to discontinue motor advancement, the processor changes line 20 (U5) to a negative level. This results in a positive level to OR circuit 11. However, as previously described, this has no effect on output line 36 until time *t*3. The time *t*3 to *t*4 line 138 is negative and thus OR circuit 12 will be actuated along lines 32 and 33 producing a positive level on line 34. Since OR circuit 11 now has two positive inputs, its output will change to minus which in turn will cause the OR circuit combination 11 and 12 to latch up with a negative input to AND gate 13 giving a continuous positive level on the output line 39. This reset condition is maintained as long as the processor maintains line 20 (U5) at a negative level. On the other hand, if the processor wants to continue the stepping action, line 20 is held positive forcing line 30 to a negative level through inverter 10. This maintains a continuous positive level on the output of OR circuit 11 and the appearance of a negative level on line 138 from sampler 14 will have no effect on the setting of the latch circuit provided by OR circuits 11 and 12. Thus, continuous stepping action is provided and the samplers will complete the cycles in a sequential manner.

Refer next to the truth table and time chart of FIG. 4. If the rotor is positioned at a steady state step 1, this information is held by the last step memory 2. This step 1 signal is fed to the translator 3 along line 26 in FIG. 1. This results in line 49 to the power drivers 6 being energized which in turn actuates motor coil A1 along line 53. This is illustrated by the truth table in FIG. 4 by cross-indexing the stop command which exists prior to the time $t0$ and the last step memory output LM1. From time $t0$ to $t3$, the clockwise command is applied to the translator as described earlier. Simultaneously, step 1 (LM1) is indicated to the translator and according to the truth table in FIG. 4 results in coil B2 being energized. At time $t1$, the stop command is added to the translator and referring again to the truth table, step 1 and stop results in coil A1 being energized. Thus, from time $t1$ to $t2$, both coils A1 and B2 are energized giving the required deceleration. From time $t2$ to $t3$, B2 is the only coil energized. At time $t3$, the rotor has arrived at the steady state position of step 2 and then the minor loop is closed updating the translator input to LM2 for step 2. Simultaneously, a stop command is given to the translator which with a LM2 input cross-indexes into coil B2 being energized. The motor input is therefore not altered at $t3$ at all and since B2 provides holding torque for step 2, no further rotor action is experienced. Depending upon processor action, further steps may be taken or the stepping action may be ceased.

It will of course be understood by those skilled in the art that while in the preferred embodiment the command signals are derived entirely from the processor that other alternate systems are available. For instance such a system is shown and described in a patent applicaiton filed on the same day as the subject application entitled "Time Optimal Servo Control System," Ser. No. 606,362, assigned to the assignee of the subject invention.

While in the hybrid mode during initial acceleration, the motor will accelerate smoothly up to 1500 steps per second and ideal velocity has been found to be 1000 steps per second.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A system for controlling the operation of a stepping motor having four windings which can be selectively energized in pairs to cause the rotor of the motor to position between two adjacent poles of the motor or energized singularly to cause the rotor to position in alignment with a pole of the motor, said system comprising:

means for providing an output pulse indicative of current rotor position when said rotor is essentially in alignment with a pole of said motor, and means for applying said output pulse simultaneously to two adjacent ones of said windings during acceleration and to one of said windings during deceleration.

2. The system of claim 1 wherein said means for applying said output pulses, for movement of multiple steps during acceleration applies said output pulses simultaneously to the first and second windings in the direction of travel in advance of the current rotor position and after a predetermined velocity has been reached, applies said output pulses simultaneously to the second and third windings in the direction of travel in advance of the current rotor position.

3. The system of claim 1 wherein said means for applying said output pulses, for movements of multiple steps, initially during deceleration applies said output pulses to the first winding in the direction of travel in advance of the current rotor position and after a predetermined velocity has been achieved applies said output pulses to the winding corresponding to current rotor position.

4. The system of claim 2 wherein said predetermined speed is 1000 steps per second.

5. The system of claim 3 wherein said predetermined speed is 600 steps per second.

6. The system of claim 2 wherein said means for applying said output pulses, for movement of multiple steps, initially during deceleration applies said output pulses to the said first winding in the direction of travel in advance of the current rotor position and after a predetermined velocity has been achieved applies said output pulses to the winding corresponding to current rotor position.

7. The system of claim 6 wherein said means for providing an output pulse includes a step discriminator and a last step memory operable to provide a signal indicative of previous rotor position while said rotor is moving between poles.

8. The system of claim 7 wherein said means for applying said output pulses includes a power driver connected to said windings, a processor for furnishing control signals in accordance with the speed and direction to be moved and a translator receptive of both said signals from said last step memory and said command signals for applying energizing signals to said power driver.

9. The apparatus of claim 8 further including a step-to-step control means receptive of signals from said processor for furnishing step-to-step control signals to said translator such that initially during movement between the old and the new step the winding corresponding to the said new step is energized; after a predetermined time the winding corresponding to the said new step and the winding corresponding to the said old step is energized; and then a predetermined time after said first predetermined time, only the winding corresponding to the said new step is energized.

References Cited

UNITED STATES PATENTS

| | | | |
|---|---|---|---|
| 3,324,369 | 6/1967 | Markakis | 318—138 |
| 3,353,076 | 11/1967 | Haines | 318—138 |
| 3,374,410 | 3/1968 | Cronquist et al. | 310—49 XR |

ORIS L. RADER, Primary Examiner

G. R. SIMMONS, Assistant Examiner

U.S. Cl. X.R.

318—254